(12) United States Patent
Ohsawa et al.

(10) Patent No.: US 11,296,314 B2
(45) Date of Patent: Apr. 5, 2022

(54) NEGATIVE ELECTRODE MATERIAL, NON-AQUEOUS ELECTROLYTE SECONDARY BATTERY, AND METHOD OF PRODUCING THE SAME

(71) Applicant: TOYOTA JIDOSHA KABUSHIKI KAISHA, Toyota (JP)

(72) Inventors: Ryosuke Ohsawa, Okazaki (JP); Akira Tsujiko, Miyoshi (JP); Kaoru Inoue, Hirakata (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 309 days.

(21) Appl. No.: 16/288,225

(22) Filed: Feb. 28, 2019

(65) Prior Publication Data
US 2019/0305305 A1 Oct. 3, 2019

(30) Foreign Application Priority Data
Mar. 28, 2018 (JP) .............................. JP2018-061641

(51) Int. Cl.
*H01M 4/36* (2006.01)
*H01M 4/48* (2010.01)
*H01M 4/485* (2010.01)
*H01M 4/04* (2006.01)
*H01M 4/1391* (2010.01)
*H01M 4/62* (2006.01)
*H01M 10/0525* (2010.01)
*H01M 4/131* (2010.01)
*H01M 4/02* (2006.01)

(52) U.S. Cl.
CPC ......... *H01M 4/366* (2013.01); *H01M 4/0404* (2013.01); *H01M 4/131* (2013.01); *H01M 4/1391* (2013.01); *H01M 4/364* (2013.01); *H01M 4/483* (2013.01); *H01M 4/485* (2013.01); *H01M 4/62* (2013.01); *H01M 10/0525* (2013.01); *H01M 2004/027* (2013.01); *Y02E 60/10* (2013.01); *Y02P 70/50* (2015.11)

(58) Field of Classification Search
CPC ....... H01M 10/0525; H01M 2004/027; H01M 4/0404; H01M 4/131; H01M 4/1391; H01M 4/364; H01M 4/366; H01M 4/483; H01M 4/485; H01M 4/62; Y02E 60/10; Y02P 70/50
See application file for complete search history.

(56) References Cited

U.S. PATENT DOCUMENTS

2004/0214081 A1\* 10/2004 Nobuta .................. H01M 4/60
429/212
2011/0244334 A1    10/2011 Kawada
2017/0040599 A1\*  2/2017 Kamo .................. H01M 4/587

FOREIGN PATENT DOCUMENTS

| JP | 2004-349079 A | 12/2004 |
| JP | 2011-222153 A | 11/2011 |
| JP | 2011-258489 A | 12/2011 |

\* cited by examiner

*Primary Examiner* — Lingwen R Zeng
(74) *Attorney, Agent, or Firm* — Oliff PLC (57) ABSTRACT

A negative electrode material contains composite particles. Each of the composite particles contains a negative electrode active material particle and a film. The negative electrode active material particle contains a silicon oxide phase and a lithium silicate phase. The film covers a surface of the negative electrode active material particle. The film contains an anion-exchange resin. To an ion-exchange group of the anion-exchange resin, a fluoride ion is bound. The content of the anion-exchange resin in the negative electrode material is not higher than 33 mass %.

7 Claims, 2 Drawing Sheets

NEGATIVE ELECTRODE MATERIAL, NON-AQUEOUS ELECTROLYTE SECONDARY BATTERY, AND METHOD OF PRODUCING THE SAME

This nonprovisional application claims priority to Japanese Patent Application No. 2018-061641 filed on Mar. 28, 2018, with the Japan Patent Office, the entire contents of which are hereby incorporated by reference.

BACKGROUND

Field

The present disclosure relates to a negative electrode material, a non-aqueous electrolyte secondary battery, and a method of producing the same.

Description of the Background Art

Japanese Patent Laying-Open No. 2011-222153 discloses a silicon oxide material ($SiO_x$) doped with lithium (Li) for use as a negative electrode material of a non-aqueous electrolyte secondary battery (hereinafter, a non-aqueous electrolyte secondary battery may be simply referred to as "battery").

SUMMARY

Research has been conducted on an $SiO_x$-containing negative electrode material. $SiO_x$ is a negative electrode active material in particle form. $SiO_x$ may have a high specific capacity. A battery containing $SiO_x$ is expected to have a high capacity. When $SiO_x$ is contained, however, irreversible capacity loss that occurs during initial charge and discharge tends to be great. As a cause of the irreversible capacity loss, the presence of a lithium silicate phase (such as $Li_4SiO_4$) formed in the battery during initial charge is considered.

Japanese Patent Laying-Open No. 2011-222153 describes that $SiO_x$ is doped with a preset amount of Li before initial charge and discharge. In other words, the negative electrode active material particle has a lithium silicate phase formed therein before initial charge and discharge. In this configuration, irreversible capacity loss that occurs in the battery during initial charge and discharge is expected to be reduced.

According to the present disclosure, the presence of the lithium silicate phase that is already formed in the raw material may lead to a decrease in battery cycle performance.

An object of the present disclosure is to improve cycle performance of a non-aqueous electrolyte secondary battery that includes negative electrode active material particles each of which contains a lithium silicate phase.

In the following, the technical structure and the effects according to the present disclosure are described. It should be noted that part of the action mechanism according to the present disclosure is based on presumption. Therefore, the scope of claims should not be limited by whether or not the action mechanism is correct.

[1] A negative electrode material according to the present disclosure is a negative electrode material for a non-aqueous electrolyte secondary battery. The negative electrode material contains composite particles. Each of the composite particles contains a negative electrode active material particle and a film. The negative electrode active material particle contains a silicon oxide phase and a lithium silicate phase. The film covers a surface of the negative electrode active material particle. The film contains an anion-exchange resin. An ion-exchange group of the anion-exchange resin has a fluoride ion bound thereto. The content of the anion-exchange resin in the negative electrode material is not higher than 33 mass %.

It is considered that in a negative electrode active material particle that contains a lithium silicate phase, the lithium silicate phase reacts with moisture present in the atmosphere, the solvent, or the like and thereby possibly produces an alkaline component (such as LiOH). A negative electrode of a battery is typically produced by paste application. The paste is prepared by mixing negative electrode active material particles, a binder, a solvent, and the like. In some cases, the solvent of the paste is water.

It is considered that within the paste, the alkaline component in the lithium silicate phase may be released into the solvent. It is considered that the alkaline component thus released into the solvent may deteriorate the binder. It is considered that the deterioration of the binder leads to a decrease in cycle performance. More specifically, it is considered that the deterioration of the binder causes such phenomena as a reduction in the binding force of the binder and thereby causes such phenomena as an increased likelihood of detachment between negative electrode active material particles during charge-discharge cycles.

In the negative electrode material according to the present disclosure, a surface of the negative electrode active material particle has a film formed thereon. The film contains an anion-exchange resin. To an ion-exchange group of the anion-exchange resin, a fluoride ion ($F^-$) is bound. It is considered that an alkaline component (such as LiOH) released from a lithium silicate phase in a paste may be converted into a fluoride (such as lithium fluoride (LiF)) at the time when the alkaline component passes through the film. The reason for this phenomenon is considered that $OH^-$, for example, is replaced by $F^-$ at the ion-exchange group. As a result, it is considered that the release of the alkaline component into the solvent is mitigated. Consequently, it is expected that deterioration of the binder is mitigated and cycle performance is improved.

The content of the anion-exchange resin in the negative electrode material is not higher than 33 mass %. In the configuration in which the content of the anion-exchange resin is higher than 33 mass %, cycle performance may decrease.

[2] The lithium silicate phase may contain at least one selected from the group consisting of $Li_2Si_2O_5$, $Li_4SiO_4$, and $Li_2SiO_3$.

In the configuration in which the lithium silicate phase contains at least one of these compounds, a decrease in irreversible capacity loss is expected to be obtained, for example.

[3] The content of the anion-exchange resin in the negative electrode material may be not lower than 4.8 mass %. In such a configuration, cycle performance is expected to be improved.

[4] The anion-exchange resin may contain a repeating unit represented by, for example, the following formula (I):

(I)

where Y represents an atomic group and Y may be $CH_3$, $CH_2Cl$, or $CH_2CH_2OH$. In the formula (I) above, the quaternary ammonium cation serves as an ion-exchange group.

[5] A non-aqueous electrolyte secondary battery according to the present disclosure includes at least a negative electrode, a positive electrode, and a non-aqueous electrolyte. The negative electrode includes at least the negative electrode material according to any one of [1] to [4] above and a binder.

The battery according to the present disclosure is expected to have an improved cycle performance. The reason is considered that deterioration of the binder during battery production may be mitigated, as mentioned above. The battery according to the present disclosure is further expected to have improved high-temperature storage properties. A reason for these phenomena is considered that the film in the battery contains a fluoride (such as LiF) because an alkaline component may have been converted into a fluoride during battery production. It is also considered that during storage at a high temperature, the fluoride-containing film mitigates the occurrence of side reaction between the negative electrode active material particles and the non-aqueous electrolyte.

[6] A method of producing a negative electrode material according to the present disclosure is a method of producing a negative electrode material for a non-aqueous electrolyte secondary battery. The method of producing a negative electrode material includes at least the following (a) and (b):

(a) preparing negative electrode active material particles; and (b) covering a surface of each of the negative electrode active material particles with a film to produce a negative electrode material containing composite particles.

The negative electrode active material particle contains a silicon oxide phase and a lithium silicate phase. The film contains an anion-exchange resin. To an ion-exchange group of the anion-exchange resin, a fluoride ion is bound. The content of the anion-exchange resin in the negative electrode material is not higher than 33 mass %.

By the method of producing a negative electrode material according to the present disclosure, the negative electrode material according to [1] above may be produced.

[7] The method of producing a non-aqueous electrolyte secondary battery according to the present disclosure includes at least the following (A) to (D):

(A) preparing the negative electrode material according to any one of [1] to [4] above;

(B) mixing at least the negative electrode material, a binder, and a solvent to prepare a paste;

(C) applying the paste to a surface of a negative electrode current collector and then drying the paste to produce a negative electrode; and (D) producing a non-aqueous electrolyte secondary battery that includes at least the negative electrode, a positive electrode, and a non-aqueous electrolyte.

The production method according to the present disclosure is expected to improve cycle performance. As a reason, a possibly mitigated deterioration of the binder during battery production is considered. The production method according to the present disclosure is also expected to have improved high-temperature storage properties attributed to a fluoride that is produced during battery production and then contained in the film.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiment") are described. The scope of claims is not limited to the description below.

<Negative Electrode Material>

Figure 1:
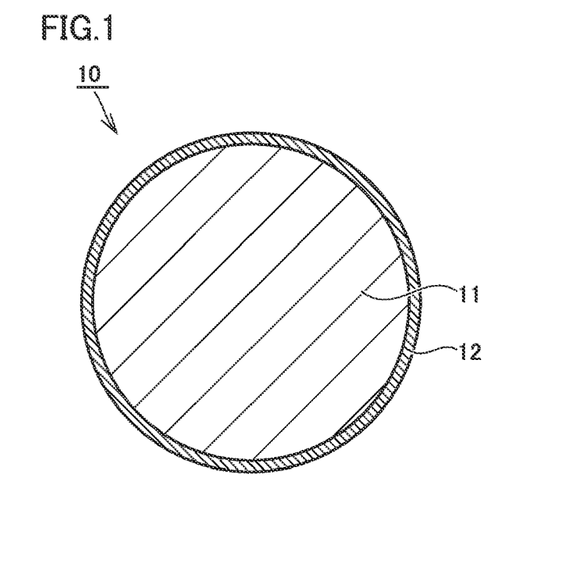
FIG. 1 is a conceptual sectional view illustrating the structure of the composite particles according to the present embodiment.

FIG. 1 is a conceptual sectional view illustrating the structure of composite particles according to the present embodiment.

A negative electrode material according to the present embodiment is a negative electrode material for a non-aqueous electrolyte secondary battery. The non-aqueous electrolyte secondary battery is described below in detail. The negative electrode material contains composite particles 10. Each composite particle 10 has a core-shell structure. More specifically, each composite particle 10 contains a negative electrode active material particle 11 (core) and a film 12 (shell). The negative electrode material may consist of a single composite particle 10. The negative electrode material may consist of a plurality of composite particles 10. In other words, the negative electrode material may be in powder form.

<<Negative Electrode Active Material Particles>>

Negative electrode active material particle 11 serves as the core of composite particle 10. Negative electrode active material particle 11 may have a D50 not lower than 0.1 μm and not higher than 50 μm, for example. The D50 refers to the particle size in volume-based particle size distribution at which the cumulative particle volume (accumulated from the side of small sizes) reaches 50% of the total particle volume. The D50 may be measured with a laser-diffraction particle size distribution analyzer, for example.

Negative electrode active material particle 11 contains a silicon oxide ($SiO_x$) phase and a lithium silicate phase. Negative electrode active material particle 11 may contain a trace amount of impurities and the like that are inevitably entrapped during production or other processes. Negative electrode active material particle 11 may further contain a silicon (Si) phase, for example. Negative electrode active material particle 11 may further contain, for example, an alloy phase containing an alloy of Si with other metals. Negative electrode active material particle 11 may substantially consist of an $SiO_x$ phase and a lithium silicate phase.

The $SiO_x$ phase is the main phase of negative electrode active material particle 11. Within the $SiO_x$ phase, charge-discharge reaction may proceed. The $SiO_x$ phase may be represented by, for example, the following formula (II):

$$SiO_x \qquad (II)$$

where x satisfies $0<x\leq1.5$.

In the above formula (II), "x" refers to the ratio of the concentration of oxygen (O) atoms to the concentration of silicon (Si) atoms. x may be measured by Auger electron spectrometry, glow discharge mass spectrometry, or inductively coupled plasma atomic emission spectrometry, for example. Measurement of x may be carried out at least three times. The arithmetic mean of these at least three measurements may be used. x may satisfy $0.8 \leq x \leq 1.2$, for example.

The lithium silicate phase is formed by Li doping into the $SiO_x$ phase. The presence of the lithium silicate phase may be identified by X-ray diffraction (XRD). The specific method is as follows: in an XRD chart attributed to negative electrode active material particles 11, the intensity ($I_A$) of the peak detected at a diffraction angle (2θ) ranging from 23° to 26° and the intensity ($I_B$) of the peak detected at a diffraction angle (2θ) ranging from 37° to 38° are measured; and if the relationship "$I_A > I_B$" is satisfied, it is considered that negative electrode active material particle 11 contains a lithium silicate phase.

The ratio of the content of the $SiO_x$ phase and the content of the lithium silicate phase is not particularly limited. It is considered that the content of the $SiO_x$ phase and the content of the lithium silicate phase may satisfy, for example, the following relationship: "($SiO_x$ phase):(lithium silicate phase)=99.99:0.01 to 80:20 (molar ratio)".

The lithium silicate phase may contain any type of lithium silicate. The lithium silicate phase may contain $Li_2Si_2O_5$, $Li_2SiO_3$, $Li_4SiO_4$, $Li_6Si_2O_7$, and/or $Li_8SiO_6$, for example. The lithium silicate phase may contain at least one selected from the group consisting of $Li_2Si_2O_5$, $Li_4SiO_4$, and $Li_2SiO_3$, for example. In the configuration in which the lithium silicate phase contains any of these lithium silicates, a decrease in irreversible capacity loss is expected to be obtained, for example.

<<Film>>

Film 12 serves as the shell for composite particle 10. Film 12 covers a surface of negative electrode active material particle 11. Desirably, film 12 covers substantially the entire surface of negative electrode active material particle 11. However, it is considered that part of the surface of negative electrode active material particle 11 may have no film 12 formed thereon as long as cycle performance can be improved. In other words, it is considered that film 12 may cover at least part of the surface of negative electrode active material particle 11.

Film 12 contains an anion-exchange resin. Film 12 may substantially consist of an anion-exchange resin. According to the present embodiment, an ion-exchange group of the anion-exchange resin has $F^-$ bound thereto. It is considered that with this configuration, an alkaline component (such as LiOH) released from the lithium silicate phase may be converted into a fluoride (such as LiF).

The content of the anion-exchange resin in the negative electrode material is not higher than 33 mass %. In the configuration in which the content of the anion-exchange resin is higher than 33 mass %, cycle performance may decrease. The content of the anion-exchange resin in the negative electrode material may be not lower than 0.5 mass %, for example. The content of the anion-exchange resin in the negative electrode material may be not lower than 4.8 mass %. In such configurations, cycle performance is expected to be improved.

The anion-exchange resin is not particularly limited. The anion-exchange resin may be weakly basic. The anion-exchange resin may be strongly basic. The anion-exchange resin may contain a repeating unit represented by, for example, the formula (I) above. The anion-exchange resin may substantially consist of a repeating unit represented by the formula (I) above.

In the formula (I) above, the quaternary ammonium cation serves as an ion-exchange group. The anion-exchange resin contains a plurality of ion-exchange groups. According to the present embodiment, the ion-exchange group has $F^-$ bound thereto. It is desirable that substantially all the ion-exchange groups have $F^-$ bound thereto. However, it is considered that some of the ion-exchange groups may have, for example, an anion other than $F^-$ bound thereto as long as cycle performance can be improved. In other words, it is considered that at least one of the ion-exchange groups may have $F^-$ bound thereto.

In the configuration in which the ion-exchange group has an anion (such as $OH^-$) other than $F^-$ bound thereto, the anion other than $F^-$ may be replaced with $F^-$ by liquid phase treatment, for example.

The atomic group (Y) in the formula (I) above may be $CH_3$, $CH_2Cl$, or $CH_2CH_2OH$, for example. Depending on the type of the atomic group (Y), the binding capability of the ion-exchange group may vary. And it is considered that the higher the binding capability of the ion-exchange group is, the more readily the alkaline component is captured. As a result, cycle performance is expected to be improved. It is considered that the binding capability increases in the following manner: (binding capability with $CH_2CH_2OH$)<(binding capability with $CH_3$)<(binding capability with $CH_2Cl$). The atomic group (Y) may be $CH_3$ or $CH_2Cl$. The atomic group (Y) may be $CH_2Cl$.

For example, it is considered that the ion-exchange resin may contain at least one selected from the group consisting of the following repeating units:

(1) a repeating unit represented by the formula (I) above in which the atomic group (Y) is $CH_3$;

(2) a repeating unit represented by the formula (I) above in which the atomic group (Y) is $CH_2Cl$; and (3) a repeating unit represented by the formula (I) above in which the atomic group (Y) is $CH_2CH_2OH$.

For example, it is considered that film 12 may contain at least one selected from the group consisting of the following ion-exchange resins:

(1) an ion-exchange resin that contains a repeating unit represented by the formula (I) above in which the atomic group (Y) is $CH_3$;

(2) an ion-exchange resin that contains a repeating unit represented by the formula (I) above in which the atomic group (Y) is $CH_2Cl$; and (3) an ion-exchange resin that contains a repeating unit represented by the formula (I) above in which the atomic group (Y) is $CH_2CH_2OH$.

<Non-Aqueous Electrolyte Secondary Battery>

Figure 2:
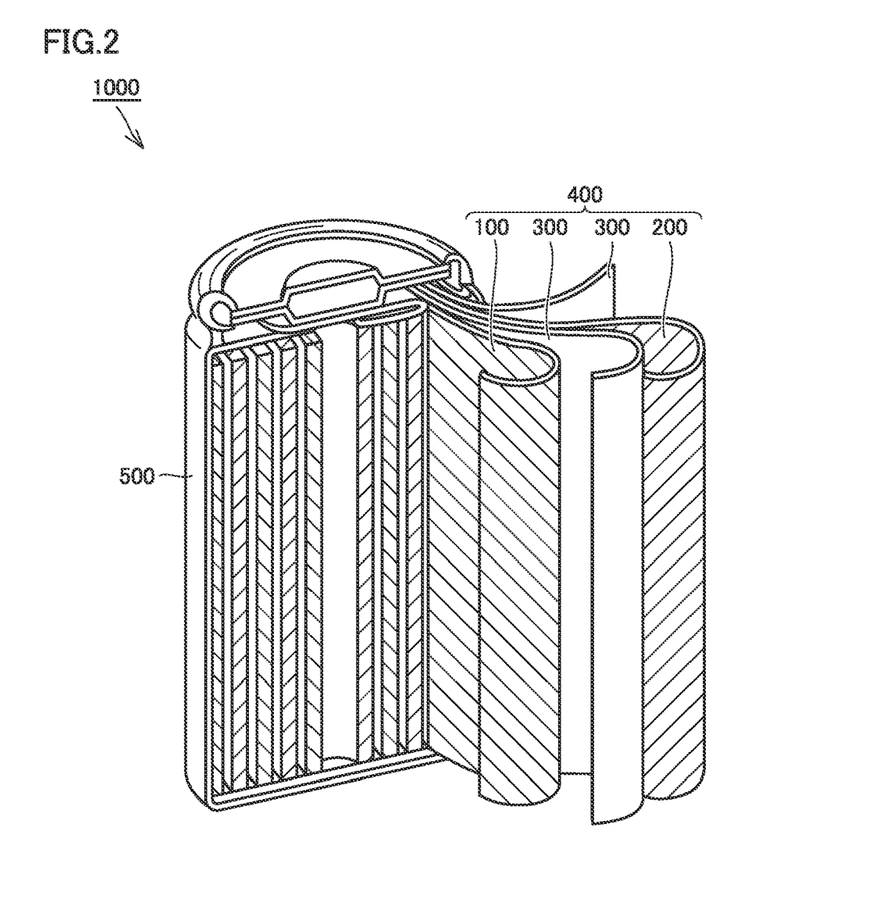
FIG. 2 is a schematic view illustrating the structure of the non-aqueous electrolyte secondary battery according to the present embodiment.

FIG. 2 is a schematic view illustrating the structure of the non-aqueous electrolyte secondary battery according to the present embodiment.

A battery 1000 is a non-aqueous electrolyte secondary battery. Battery 1000 includes a casing 500. Casing 500 is cylindrical. However, the shape of casing 500 is not limited to cylindrical. Casing 500 may be prismatic, for example.

Casing 500 is hermetically sealed. Casing 500 may be made of resin, iron (Fe), stainless steel, aluminum (Al), and/or Al alloy, for example. Casing 500 may be an aluminum-laminated pouch, for example. In other words, battery 1000 may be a laminate-type battery. Casing 500 may be equipped with a current interrupt device (CID), a gas-discharge valve, and a liquid inlet, for example.

Casing 500 accommodates an electrode array 400 and a non-aqueous electrolyte (not shown). Electrode array 400 includes a positive electrode 100, a negative electrode 200, and a separator 300. In other words, battery 1000 includes at least negative electrode 200, positive electrode 100, and a non-aqueous electrolyte. Electrode array 400 is a wound-type one. Electrode array 400 is formed by stacking positive electrode 100, separator 300, negative electrode 200, and separator 300 in this order and then winding them in a spiral fashion.

Electrode array 400 may be a stack-type one. More specifically, electrode array 400 may be formed by alternately stacking one positive electrode 100 and one negative electrode 200 and then repeating this alternate stacking process more than once. In each space between positive electrode 100 and negative electrode 200, separator 300 is interposed. In the configuration in which the non-aqueous electrolyte is a solid electrolyte, separator 300 may be substantially unnecessary.

<<Negative Electrode>>

Negative electrode 200 according to the present embodiment is in sheet form. Negative electrode 200 includes a negative electrode current collector and a negative electrode composite material layer. The negative electrode current collector functions to collect electric currents. The negative electrode current collector also serves as an electrode substrate. The negative electrode current collector may be a copper (Cu) foil sheet or a Cu alloy foil sheet, for example. The negative electrode current collector may have a thickness not smaller than 5 μm and not greater than 50 μm, for example.

The negative electrode composite material layer is formed on a surface of the negative electrode current collector. The negative electrode composite material layer may have a thickness not smaller than 10 μm and not greater than 200 μm, for example. The negative electrode composite material layer contains the negative electrode material according to the present embodiment and a binder. This means that negative electrode 200 includes at least the negative electrode material according to the present embodiment and a binder. The negative electrode material according to the present embodiment is described above in detail. It is considered that in battery 1000, film 12 may further contain a fluoride (such as LiF).

Herein, the negative electrode material according to the present embodiment is also called "$SiO_x$ material" for convenience. As long as negative electrode 200 includes an $SiO_x$ material and a binder, the negative electrode composite material layer may further contain other components. As these other components, a negative electrode active material other than an $SiO_x$ material (hereinafter, such a negative electrode active material is also called "additional negative electrode active material") and a conductive material are considered, for example.

As the additional negative electrode active material, graphite, soft carbon, hard carbon, silicon, silicon-based alloy, tin, tin oxide, tin-based alloy, Li (pure metal), Li alloy (such as Li—Al alloy), and lithium titanate are considered, for example. The graphite may be artificial graphite. The graphite may be natural graphite. In the configuration in which negative electrode 200 includes the additional negative electrode active material, the following relationship, for example, may be satisfied: "($SiO_x$ material):(additional negative electrode active material)=5:95 to 95:5 (mass ratio)". For example, the following relationship may be satisfied: "($SiO_x$ material):(additional negative electrode active material)=10:90 to 30:70 (mass ratio)". For example, the following relationship may be satisfied: "($SiO_x$ material):graphite=10:90 to 30:70 (mass ratio)". For example, combining the $SiO_x$ material with graphite may lead to an improvement in cycle performance.

The binder is not particularly limited. The binder may be carboxymethylcellulose (CMC), styrene-butadiene rubber (SBR), polyamide (PA), polyimide (PI), polyamide-imide (PAI), and/or polyvinylidene difluoride (PVdF), for example. Negative electrode 200 may include only one type of the binder. Negative electrode 200 may include two or more types of the binder. The content of the binder may be, for example, not lower than 0.1 part by mass and not higher than 10 parts by mass relative to 100 parts by mass of the negative electrode active material (which is the $SiO_x$ material and the additional negative electrode active material combined).

The conductive material is not particularly limited. The conductive material may be carbon black (such as acetylene black and Ketjenblack (registered trademark)), vapor grown carbon fibers (VGCF), and/or carbon nanotubes (CNT), for example. The content of the conductive material may be, for example, not lower than 0.1 part by mass and not higher than 10 parts by mass relative to 100 parts by mass of the negative electrode active material.

<<Positive Electrode>>

Positive electrode 100 may be in sheet form, for example. Positive electrode 100 includes a positive electrode current collector and a positive electrode composite material layer. The positive electrode current collector may be an Al foil sheet, for example. The positive electrode current collector may have a thickness not smaller than 5 μm and not greater than 50 μm, for example.

The positive electrode composite material layer is formed on a surface of the positive electrode current collector. The positive electrode composite material layer may have a thickness not smaller than 10 μm and not greater than 200 μm, for example. The positive electrode composite material layer contains at least a positive electrode active material. The positive electrode composite material layer may further contain a conductive material and a binder.

The positive electrode active material may be particles, for example. The positive electrode active material may have a D50 not lower than 1 μm and not higher than 30 μm, for example. The positive electrode active material is not particularly limited. The positive electrode active material may be lithium cobalt oxide ($LiCoO_2$), lithium nickel oxide ($LiNiO_2$), lithium manganese oxide (such as $LiMnO_2$ and $LiMn_2O_4$), lithium nickel cobalt manganese oxide (such as $LiNi_{1/3}Co_{1/3}Mn_{1/3}O_2$), lithium nickel cobalt aluminate (such as $LiNi_{0.82}Co_{0.15}Al_{0.03}O_2$), and/or lithium iron phosphate, for example. Positive electrode 100 may include only one type of the positive electrode active material. Positive electrode 100 may include two or more types of the positive electrode active material.

The conductive material is not particularly limited. For example, the conductive material may be a material described above as an example of the conductive material that may be contained in negative electrode 200. The content of the conductive material may be, for example, not lower than 0.1 part by mass and not higher than 10 parts by mass relative to 100 parts by mass of the positive electrode active material. The binder is not particularly limited. The binder may be PVdF, for example. The content of the binder may be, for example, not lower than 0.1 part by mass and not higher than 10 parts by mass relative to 100 parts by mass of the positive electrode active material.

<<Separator>>

Separator 300 is electrically insulating. Separator 300 is interposed between positive electrode 100 and negative electrode 200. Positive electrode 100 and negative electrode 200 are separated from each other by separator 300. Separator 300 is a porous film. Separator 300 allows the electrolyte solution to pass therethrough. Separator 300 may have a thickness not smaller than 10 μm and not greater than 30 μm, for example. Separator 300 may be a porous polyolefin film, for example.

Separator 300 may have a monolayer structure. Separator 300 may consist of a porous polyethylene (PE) film, for example. Separator 300 may have a multilayer structure. Separator 300 may be formed by, for example, stacking a porous polypropylene (PP) film, a porous PE film, and a porous PP film in this order. Separator 300 may have a heat-resistant film on a surface thereof. The heat-resistant film contains a heat-resistant material. The heat-resistant material may be boehmite, silica, and/or titania, for example.

<<Non-Aqueous Electrolyte>>

The non-aqueous electrolyte is a lithium-ion conductor. The non-aqueous electrolyte may be liquid, for example. The non-aqueous electrolyte may be gel, for example. The non-aqueous electrolyte may be solid, for example. The non-aqueous electrolyte may be an electrolyte solution or an ionic liquid, for example. In the present embodiment, the non-aqueous electrolyte in the form of electrolyte solution is described as an example.

The electrolyte solution contains at least a lithium (Li) salt and a solvent. The Li salt is dissolved in the solvent. The concentration of the Li salt may be, for example, not lower than 0.5 mol/L and not higher than 2 mol/L (not lower than 0.5 M and not higher than 2 M). The Li salt may be $LiPF_6$, $LiBF_4$, $LiN(FSO_2)_2$, and/or $LiN(CF_3SO_2)_2$, for example. The electrolyte solution may contain only one type of the Li salt. The electrolyte solution may contain two or more types of the Li salt.

The solvent is aprotic. The solvent may be a mixture of a cyclic carbonate and a chain carbonate, for example. The mixing ratio may be, for example, "(cyclic carbonate):(chain carbonate)=1:9 to 5:5 (volume ratio)".

The cyclic carbonate may be ethylene carbonate (EC), propylene carbonate (PC), butylene carbonate (BC), and/or fluoroethylene carbonate (FEC), for example. The solvent may contain only one type of the cyclic carbonate. The solvent may contain two or more types of the cyclic carbonate.

The chain carbonate may be dimethyl carbonate (DMC), ethyl methyl carbonate (EMC), and/or diethyl carbonate (DEC), for example. The solvent may contain only one type of the chain carbonate. The solvent may contain two or more types of the chain carbonate.

The solvent may contain a lactone, a cyclic ether, a chain ether, and/or a carboxylic acid ester, for example. The lactone may be γ-butyrolactone (GBL) and/or δ-valerolactone, for example. The cyclic ether may be tetrahydrofuran (THF), 1,3-dioxolane, and/or 1,4-dioxane, for example. The chain ether may be 1,2-dimethoxyethane (DME), for example. The carboxylic acid ester may be methyl formate (MF), methyl acetate (MA), and/or methyl propionate (MP), for example.

The electrolyte solution may further contain various additives in addition to the Li salt and the solvent. The electrolyte solution may contain the additives in an amount not lower than 0.005 mol/L and not higher than 0.5 mol/L, for example. Examples of the additives include a gas generation agent (also called "anti-overcharging additive"), a solid electrolyte interface (SEI) film-forming agent, and a flame retardant. The gas generation agent may be cyclohexylbenzene (CHB) and/or biphenyl (BP), for example. The SEI-film-forming agent may be vinylene carbonate (VC), vinylethylene carbonate (VEC), $LiB(C_2O_4)_2$, $LiPO_2F_2$, propane sultone (PS), and/or ethylene sulfite (ES), for example. The flame retardant may be a phosphoric acid ester and/or a phosphazene, for example.

<Method of Producing Negative Electrode Material>

Figure 3:
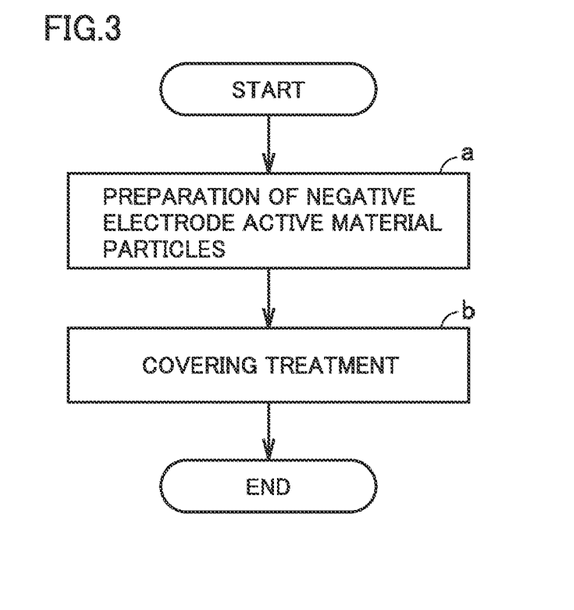
FIG. 3 is a flow chart schematically illustrating the method of producing a negative electrode material according to the present embodiment.

FIG. 3 is a flow chart schematically illustrating the method of producing a negative electrode material according to the present embodiment.

The method of producing a negative electrode material according to the present embodiment includes at least "(a) preparation of negative electrode active material particles" and "(b) covering treatment".

<<(a) Preparation of Negative Electrode Active Material Particles>>

The method of producing a negative electrode material according to the present embodiment includes preparing negative electrode active material particles 11. Each negative electrode active material particle 11 contains the $SiO_x$ phase and the lithium silicate phase.

Negative electrode active material particles 11 may be prepared by, for example, the method described below. First, $SiO_x$ is prepared. $SiO_x$ may be prepared by synthesizing $SiO_x$ or by purchasing a commercially available $SiO_x$.

Then, lithium hydride (LiH), for example, is prepared as a Li material. $SiO_x$ (powder) and the Li material (powder) are mixed to prepare a mixture. The resulting mixture is heated in an argon (Ar) atmosphere at about 1000° C. for about 60 minutes. Thus, a lithium silicate phase may be introduced into $SiO_x$. In this way, negative electrode active material particles 11 each of which contains an $SiO_x$ phase and a lithium silicate phase may be prepared. Then, negative electrode active material particles 11 may be rinsed with an inorganic acid (such as hydrochloric acid). The rinsing may reduce the amount of impurities, for example.

<<(b) Covering Treatment>>

The method of producing a negative electrode material according to the present embodiment includes covering a surface of negative electrode active material particle 11 with film 12 to produce a negative electrode material containing composite particles 10.

An anion-exchange resin is prepared. For example, the anion-exchange resin may be prepared by purchasing a commercially available anion-exchange resin. In the case in which an ion-exchange group of the thus-prepared anion-exchange resin has an anion (such as OH⁻) other than F⁻ bound thereto, the anion is replaced with $F^-$. More specifically, $F^-$ is made to be bound to the ion-exchange group. For example, replacing the anion with $F^-$ may be carried out by immersing the anion-exchange resin in a liquid phase that contains $F^-$.

Then, the anion-exchange resin is pulverized. Thus, the anion-exchange resin in powder form is prepared. In the pulverization process, an attritor or a ball mill may be used, for example. For example, an "MSC50" attritor manufactured by Nippon Coke & Engineering Co., Ltd. may be used.

The anion-exchange resin (powder) and negative electrode active material particles 11 (powder) are mixed together. By this procedure, the anion-exchange resin may be made adhered to a surface of negative electrode active material particle 11. In other words, film 12 containing the anion-exchange resin may be formed. Film 12 may cover a surface of negative electrode active material particle 11. The anion-exchange resin may be integrated with a surface of negative electrode active material particle 11 by the action of impact, compression, shearing, and/or the like. The integration of the anion-exchange resin with negative electrode active material particle 11 may be carried out by using, for example, "Nobilta MINI, NOB-MINI" manufactured by Hosokawa Micron Corporation.

By thus covering a surface of negative electrode active material particle 11 with film 12, composite particles 10 may be formed. In this way, a negative electrode material containing composite particles 10 may be produced.

<Method of Producing Non-Aqueous Electrolyte Secondary Battery>

Figure 4:
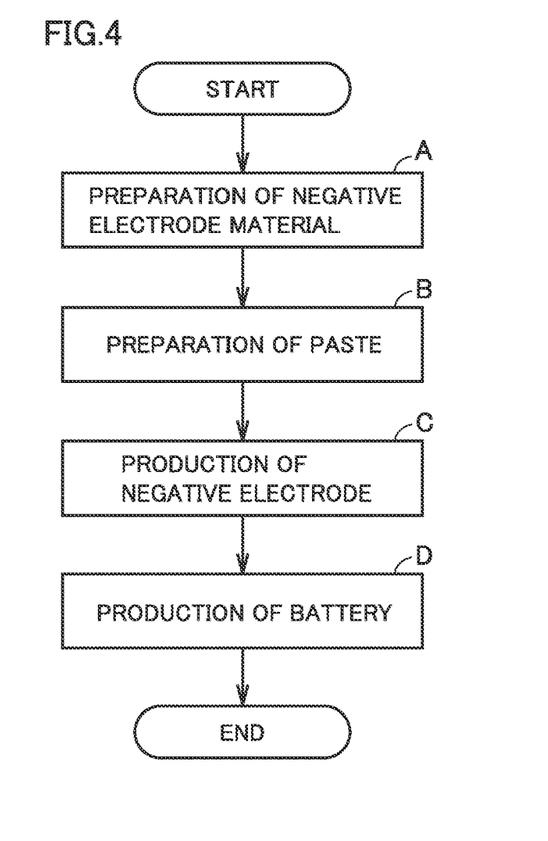
FIG. 4 is a flow chart schematically illustrating the method of producing a non-aqueous electrolyte secondary battery according to the present embodiment.

FIG. 4 is a flow chart schematically illustrating the method of producing a non-aqueous electrolyte secondary battery according to the present embodiment. The method of producing a battery according to the present embodiment includes at least "(A) preparation of a negative electrode material", "(B) preparation of a paste", "(C) production of a negative electrode", and "(D) production of a battery".

<<(A) Preparation of Negative Electrode Material>>

The method of producing a battery according to the present embodiment includes preparing the negative electrode material according to the present embodiment. The negative electrode material is described above in detail. The negative electrode material may be prepared by, for example, the above-mentioned method of producing a negative electrode material.

<<(B) Preparation of Paste>>

The method of producing a battery according to the present embodiment includes mixing at least the negative electrode material, a binder, and a solvent to prepare a paste. The negative electrode material according to the present embodiment contains the anion-exchange resin and $F^-$, and therefore it is considered that deterioration of the binder in the paste may be mitigated.

The binder, for example, is described above in detail. As needed, a conductive material and an additional negative electrode active material (such as graphite), for example, may be further mixed therewith. The solvent may be selected in accordance with the type of the binder. When the binder is a combination of CMC and SBR, for example, the solvent may be water. When the binder is PVdF, for example, the solvent may be N-methyl-2-pyrrolidone (NMP). In the mixing process, a typical stirrer (such as a planetary mixer) may be used.

<<(C) Production of Negative Electrode>>

The method of producing a battery according to the present embodiment includes applying the paste to a surface of a negative electrode current collector and then drying the paste to produce negative electrode 200.

The negative electrode current collector is described above in detail. In the application process, a typical applicator may be used. In the drying process, a typical dryer may be used. By thus applying the paste to a surface of the negative electrode current collector and then drying the paste, a negative electrode composite material layer may be formed. After the drying, the resulting negative electrode composite material layer may be compressed with, for example, a rolling mill. Thus, negative electrode 200 is produced. Negative electrode 200 may be cut into predetermined dimensions so as to meet the specification of battery 1000.

<<(D) Production of Battery>>

The method of producing a battery according to the present embodiment includes producing battery 1000 that includes at least negative electrode 200, positive electrode 100, and a non-aqueous electrolyte.

Positive electrode 100 is prepared. Positive electrode 100 is described above in detail. For example, positive electrode 100 may be produced by paste application in the same manner as in the production of negative electrode 200. Separator 300 is prepared. Separator 300 is described above in detail.

Positive electrode 100, separator 300, negative electrode 200, and separator 300 are stacked in this order and then wound in a spiral fashion, and thus electrode array 400 may be formed. Casing 500 is prepared. Casing 500 is described above in detail. In casing 500, electrode array 400 is placed.

The non-aqueous electrolyte is prepared. The non-aqueous electrolyte is described above in detail. For example, an electrolyte solution is injected into casing 500. After injection, casing 500 is hermetically sealed. Thus, battery 1000 may be produced.

EXAMPLES

In the following, examples according to the present disclosure are described. The scope of claims is not limited to the description below.

Example 1

<<(A) Preparation of Negative Electrode Material>>

<<(a) Preparation of Negative Electrode Active Material Particles>>

SiO powder was prepared. SiO refers to an "$SiO_x$" represented the above formula (II) in which x=1. As a Li material, LiH powder was prepared. SiO and LiH were mixed, and thus a mixture was prepared. The resulting mixture was heated in an Ar atmosphere at 1000° C. for 60 minutes. Thus, negative electrode active material particles 11 were prepared. It is considered that each negative electrode active material particle 11 contained an SiO phase and a lithium silicate phase. Negative electrode active material particles 11 were rinsed in hydrochloric acid. After rinsing, negative electrode active material particles 11 were dried.

<<(b) Covering Treatment>>

An anion-exchange resin was prepared. The anion-exchange resin contained a repeating unit represented by the formula (I) above. The atomic group (Y) in the ion-exchange group was $CH_3$. To the ion-exchange group, $OH^-$ was initially bound.

Liquid phase treatment was carried out to replace $OH^-$ bound to the ion-exchange group with $F^-$. In other words, $F^-$ was made to bind to the ion-exchange group. After the replacement, the anion-exchange resin was pulverized in an "MSC50" attritor manufactured by Nippon Coke & Engineering Co., Ltd. Thus, the anion-exchange resin in powder form was prepared.

The resulting anion-exchange resin (powder) was mixed and integrated with negative electrode active material particles 11 (powder) with the use of "Nobilta MINI, NOB-MINI" manufactured by Hosokawa Micron Corporation, and thus film 12 was formed on a surface of negative electrode active material particle 11. This means that composite particles 10 were formed. It is considered that film 12 covered substantially the entire surface of negative electrode active material particle 11. Film 12 contained the anion-exchange resin.

In this way, a negative electrode material containing composite particles 10 was produced. The content of the anion-exchange resin in the negative electrode material was 0.5 mass %.

<<(B) Preparation of Paste>>

The materials described below were prepared.
Additional negative electrode active material: graphite
Conductive material: acetylene black
Binder: CMC and SBR
Solvent: water The negative electrode material, the additional negative electrode active material, the conductive material, the binder, and water were mixed, and thus a paste was prepared. The mixing ratio of solid contents was as follows: "(negative electrode material):graphite:(acetylene black):CMC:SBR=20.1:74.9:3:1:1 (mass ratio)".

<<(C) Production of Negative Electrode>>

The resulting paste was applied to a surface of a negative electrode current collector with a film applicator manufactured by Allgood. The negative electrode current collector was a Cu foil sheet. The paste was dried with a dryer, and thus a negative electrode composite material layer was formed. The drying was carried out at a temperature of 80° C. The drying duration was five minutes. Thus, negative electrode 200 was produced.

<<(D) Production of Battery>>

Positive electrode 100 was prepared. As a positive electrode active material, lithium nickel cobalt manganese oxide was used. Separator 300 was prepared. Separator 300 was a porous PE film. Positive electrode 100, separator 300, negative electrode 200, and separator 300 were stacked in this order and then wound in a spiral fashion, and thus electrode array 400 was formed.

Casing 500 was prepared. Casing 500 was cylindrical. In casing 500, electrode array 400 was placed. Into casing 500, an electrolyte solution (non-aqueous electrolyte) was injected. The electrolyte solution contained the components described below.

Li salt: $LiPF_6$ (concentration, 1 mol/L)
Solvent: [EC:DMC:EMC=3:4:3 (volume ratio)]

Casing 500 was hermetically sealed. Thus, battery 1000 (cylindrical non-aqueous electrolyte secondary battery) was produced. Battery 1000 was designed to operate at a voltage within the range from 3.0 to 4.1 V.

Examples 2 and 3

A negative electrode material was produced in the same manner as in Example 1 except that the content of the anion-exchange resin was changed as specified in Table 1 below. By using the resulting negative electrode material, battery 1000 was produced.

It should be noted that in each example and each comparative example according to the present disclosure, the mass ratio of graphite was decreased in correlation with the mass ratio of film 12 so as to maintain a constant mass ratio of negative electrode active material particles 11 in negative electrode 200.

Comparative Example 1

Battery 1000 was produced in the same manner as in Example 1 except that "(b) covering treatment" was not carried out.

Comparative Example 2

Battery 1000 was produced in the same manner as in Example 1 except that the content of the anion-exchange resin was changed as specified in Table 1 below.

Examples 4 to 6 and Comparative Example 3

A negative electrode material and battery 1000 were produced in the same manner as in Examples 1 to 3 and Comparative Example 2 except that the atomic group (Y) in the ion-exchange group of the anion-exchange resin was $CH_2Cl$.

Examples 7 to 9 and Comparative Example 4

A negative electrode material and battery 1000 were produced in the same manner as in Examples 1 to 3 and Comparative Example 2 except that the atomic group (Y) in the ion-exchange group of the anion-exchange resin was $CH_2CH_2OH$.

<Evaluation>

<<Cycle Test>>

In an environment at room temperature, 100 cycles of charge and discharge were carried out at a constant current of 2 C and a voltage within the range from 3.0 to 4.1 V. At a current of 2 C, discharging battery 1000 from its design capacity completes in 0.5 hour. The discharged capacity measured after the 100th cycle was divided by the discharged capacity measured after the first cycle, and thus capacity retention was determined. It is considered that the higher the capacity retention was, the greater the improvement in the cycle performance was.

<<High-Temperature Storage Test>>

The state of charge (SOC) of battery 1000 was adjusted to 100%. Battery 1000 was stored for four weeks in an environment at a temperature of 50° C. After storage, discharged capacity was measured. The resulting post-storage discharged capacity was divided by pre-storage discharged capacity, and thus capacity retention was determined. It is considered that the higher the capacity retention was, the greater the improvement in high-temperature storage properties was.

TABLE 1

| | Negative electrode material | | | | | | | | | Evaluation | |
|---|---|---|---|---|---|---|---|---|---|---|---|
| | Negative electrode active material particles | | Film | | Negative electrode | | | | | | High-temperature storage |
| | | | Anion-exchange resin | | | | | Binder | | Cycle test | test |
| | | | | | electrode | | Conductive material | | | Capacity | Capacity |
| | $SiO_x$ phase | Lithium silicate phase | Ion-exchange group Atomic group (Y)* | Content [mass %] | material [mass %] | Graphite [mass %] | AB [mass %] | CMC [mass %] | SBR [mass %] | retention [%] | retention [%] |
| Comp. Ex. 1 | x = 1 | Contained | — | — | 20 | 75 | 3 | 1 | 1 | 73 | 65 |
| Ex. 1 | x = 1 | Contained | $CH_3$ | 0.5 | 20.1 | 74.9 | 3 | 1 | 1 | 76 | 69 |
| Ex. 2 | x = 1 | Contained | $CH_3$ | 4.8 | 21 | 74 | 3 | 1 | 1 | 85 | 77 |
| Ex. 3 | x = 1 | Contained | $CH_3$ | 33 | 30 | 65 | 3 | 1 | 1 | 86 | 76 |
| Comp. Ex. 2 | x = 1 | Contained | $CH_3$ | 50 | 40 | 55 | 3 | 1 | 1 | 70 | 60 |
| Ex. 4 | x = 1 | Contained | $CH_2Cl$ | 0.5 | 20.1 | 74.9 | 3 | 1 | 1 | 76 | 68 |
| Ex. 5 | x = 1 | Contained | $CH_2Cl$ | 4.8 | 21 | 74 | 3 | 1 | 1 | 87 | 75 |
| Ex. 6 | x = 1 | Contained | $CH_2Cl$ | 33 | 30 | 65 | 3 | 1 | 1 | 86 | 76 |
| Comp. Ex. 3 | x = 1 | Contained | $CH_2Cl$ | 50 | 40 | 55 | 3 | 1 | 1 | 68 | 62 |
| Ex. 7 | x = 1 | Contained | $CH_2CH_2OH$ | 0.5 | 20.1 | 74.9 | 3 | 1 | 1 | 76 | 69 |
| Ex. 8 | x = 1 | Contained | $CH_2CH_2OH$ | 4.8 | 21 | 74 | 3 | 1 | 1 | 84 | 76 |
| Ex. 9 | x = 1 | Contained | $CH_2CH_2OH$ | 33 | 30 | 65 | 3 | 1 | 1 | 83 | 77 |
| Comp. Ex. 4 | x = 1 | Contained | $CH_2CH_2OH$ | 50 | 40 | 55 | 3 | 1 | 1 | 67 | 61 |

*The atomic group (Y) represents the atomic group (Y) in the formula (I).

<Results>

The results shown in Table 1 above obtained in Comparative Example 1 and Examples 1 to 9 show a tendency that when negative electrode active material particle 11 is covered with film 12 (anion-exchange resin), cycle performance is improved. It is considered that because F⁻ was bound to an ion-exchange group of the anion-exchange resin, an alkaline component in the lithium silicate phase was converted into a fluoride and, consequently, deterioration of the binder was mitigated. The above results also show a tendency that high-temperature storage properties are improved. It is considered that a fluoride contained in film 12 mitigated the occurrence of side reaction between negative electrode active material particles 11 and the non-aqueous electrolyte.

It should be noted that when the content of the anion-exchange resin was higher than 33 mass %, cycle performance decreased (in Comparative Example 2, for example). When the content of the anion-exchange resin was not lower than 4.8 mass %, cycle performance and high-temperature storage properties tended to be greatly improved (in Examples 1 to 3, for example).

The embodiments and examples disclosed herein are illustrative and non-restrictive in any respect. The technical scope indicated by the claims is intended to include any modifications within the scope and meaning equivalent to the terms of the claims.

What is claimed is:

1. A negative electrode material for a non-aqueous electrolyte secondary battery,
   the negative electrode material comprising composite particles,
   each of the composite particles containing a negative electrode active material particle and a film,
   the negative electrode active material particle containing a silicon oxide phase and a lithium silicate phase,
   the film covering a surface of the negative electrode active material particle,
   the film containing an anion-exchange resin,
   the anion-exchange resin having an ion-exchange group to which a fluoride ion is bound,
   the content of the anion-exchange resin in the negative electrode material being not higher than 33 mass %.

2. The negative electrode material according to claim 1, wherein the lithium silicate phase contains at least one selected from the group consisting of $Li_2Si_2O_5$, $Li_4SiO_4$, and $Li_2SiO_3$.

3. The negative electrode material according to claim 1, wherein the content of the anion-exchange resin in the negative electrode material is not lower than 4.8 mass %.

4. The negative electrode material according to claim 1, wherein the anion-exchange resin contains a repeating unit represented by the following formula (I):

where Y represents an atomic group and Y is $CH_3$, $CH_2Cl$, or $CH_2CH_2OH$.

5. A non-aqueous electrolyte secondary battery comprising at least a negative electrode, a positive electrode, and a non-aqueous electrolyte,
   the negative electrode comprising at least the negative electrode material according to claim 1 and a binder.

6. A method of producing a negative electrode material for a non-aqueous electrolyte secondary battery, the method comprising at least:

preparing negative electrode active material particles; and covering a surface of each of the negative electrode active material particles with a film to produce a negative electrode material containing composite particles, the negative electrode active material particle containing a silicon oxide phase and a lithium silicate phase, the film containing an anion-exchange resin, the anion-exchange resin having an ion-exchange group to which a fluoride ion is bound, the content of the anion-exchange resin in the negative electrode material being not higher than 33 mass %.

7. A method of producing a non-aqueous electrolyte secondary battery, the method comprising at least:

preparing the negative electrode material according to claim 1;

mixing at least the negative electrode material, a binder, and a solvent to prepare a paste;

applying the paste to a surface of a negative electrode current collector and then drying the paste to produce a negative electrode; and producing the non-aqueous electrolyte secondary battery that includes at least the negative electrode, a positive electrode, and a non-aqueous electrolyte.

* * * * *